United States Patent [19]

Ohshita

[11] Patent Number: 5,233,475
[45] Date of Patent: Aug. 3, 1993

[54] RECTANGULAR PRISM INCLUDING A V-SHAPED GROOVE AT A BOUNDARY

[75] Inventor: Koichi Ohshita, Tokyo, Japan

[73] Assignee: Nikon Corporation, Tokyo, Japan

[21] Appl. No.: 744,940

[22] Filed: Aug. 14, 1991

[30] Foreign Application Priority Data

Aug. 18, 1990 [JP] Japan .................................. 2-217599

[51] Int. Cl.$^5$ .............................................. G02B 5/04
[52] U.S. Cl. ................................... 359/836; 359/833; 359/613
[58] Field of Search ............... 359/836, 831, 833, 834, 359/835, 837, 613, 614

[56] References Cited

U.S. PATENT DOCUMENTS 2,096,452 10/1937 Dixon et al. ...................... 359/833

FOREIGN PATENT DOCUMENTS 248918 10/1990 Japan .................................. 359/833

*Primary Examiner*—Jon W. Henry
*Attorney, Agent, or Firm*—Shapiro and Shapiro

[57] ABSTRACT

A rectangular prism includes an entrance surface for receiving light, an exit surface from which the light emerges, two reflecting surfaces orthogonal to each other for directing the light ray incident from the entrance surface to the exit surface, and a groove of V-shaped cross-section disposed in the boundary between the entrance surface and the exit surface.

20 Claims, 2 Drawing Sheets

RECTANGULAR PRISM INCLUDING A V-SHAPED GROOVE AT A BOUNDARY

BACKGROUND OF THE INVENTION

1. Field of the Invention

This invention relates to a rectangular prism utilized in an optical instrument such as a viewfinder.

2. Related Background Art

What poses a problem in the viewfinder optical system of a photographic camera, a video camera or the like is the processing of ghost light created in this system. The main cause of the ghost light is the shape of a prism incorporated in the system.

The shape of a rectangular prism heretofore used in a portion of a viewfinder optical system and the optical path therein are shown in FIG. 1 of the accompanying drawings. FIG. 1 shows a rectangular prism in which an entrance surface 10 and an exit surface 20 coincide with the same plane and which has reflecting surfaces 30 and 40 orthogonal to each other. An effective light beam incident from the entrance surface 10, as shown by light rays 1 indicated by solid lines, is reflected by the first reflecting surface 30 and the second reflecting surface 40 and emerges from the exit surface 20 in the direction opposite to the direction of the incident light beam. However, in the actual state of use in which the rectangular prism is incorporated in the optical system, light rays enter in various directions and therefore, a light ray which may become ghost light also enters at the same time. Such light ray, like a light ray 2 indicated by broken line, has always had the risk of being reflected by the first reflecting surface 30 and totally reflected by the entrance surface 10, and thereafter being reflected by the second reflecting surface 40 and emerging from the exit surface 20. If such a light ray 2 emerges from the exit surface 20, ghost or flare will be created to deteriorate the performance of the entire optical system remarkably. Therefore, in the design of an optical system using a prism, the greatest circumspection has been necessary in deciding the shape of the prism. As a technique therefor, a U-shaped groove as shown in FIG. 2 of the accompanying drawings has been formed in the boundary between the entrance surface and the exit surface present on the same plane and the wall of the groove has been subjected to the treatment of painting the wall black. By the inner surface of the groove being painted black, ghost light is intercepted by the groove as indicated by broken line 2 and cannot arrive at the second reflecting surface 40.

SUMMARY OF THE INVENTION

In recent years, the optical plastic molding technique has progressed with giant strides and the molding of the rectangular prism as shown in FIG. 1 as well superprecisicn lenses has become possible. Plastics are very inexpensive as compared with optical parts made of glass and therefore have been utilized in various optical instruments.

However, forming the prism of FIG. 2 of inexpensive plastics presents significant problems Firstly, the shape of the groove for eliminating ghost light is unsuitable for molding and disturbance may occur in the portions of the entrance surface and exit surface which are near the groove. Secondly, the wall of the groove must be painted black as light intercepting means and this is considerably costly as compared with the cost of prism molding. Thirdly, plastics are weaker in chemical durability than glass and may involve the risk of being attacked by the black paint.

The present invention provides a rectangular prism which does not require the black paint for eliminating ghost light, and which is also well suited for plastic molding.

The present invention is a rectangular prism which has reflecting surfaces orthogonal to each other and in which a light ray incident from an entrance surface is reflected by the respective reflecting surfaces and directed to an exit surface and wherein a groove of V-shaped cross-section (hereinafter simply referred to as a V-groove) is formed in the boundary between the entrance surface and the exit surface.

With the construction of the present invention as described above, a light ray which is incident from the entrance surface 10 and may create ghost light is reflected by the first reflecting surface 30 and thereafter is totally reflected by the inclined surface 50 of the V-groove which is adjacent to the entrance surface 10 and therefore, does not emerge from the exit surface 20.

As described above, according to the present invention, the conventional U-shaped groove is replaced by a V-shaped groove, whereby a ghost light ray can be prevented without the wall of the groove being painted black. In addition, the present invention is well suited to the unitary molding of plastic and can eliminate ghost in a rectangular prism without any post-processing and any increase in cost.

DESCRIPTION OF THE PREFERRED EMBODIMENT

Figure 1:
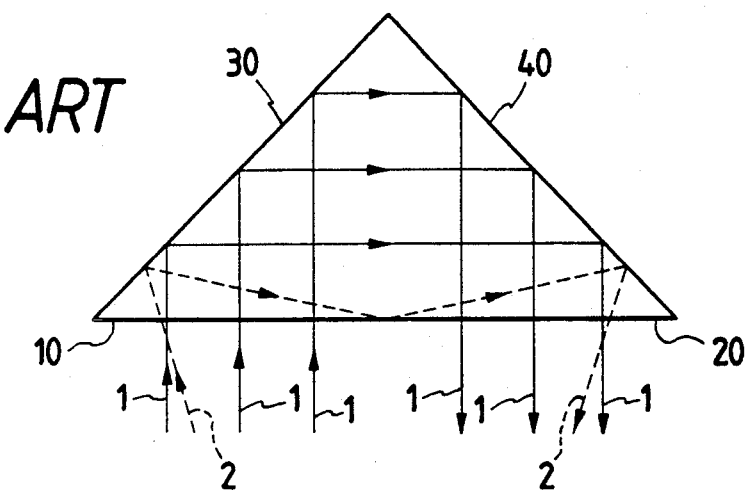
FIG. 1 is a cross-sectional view of a rectangular prism.
Figure 2:
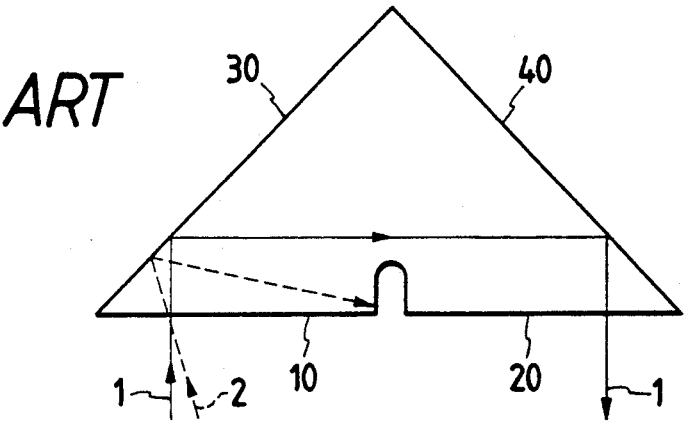
FIG. 2 is a cross-sectional view of a rectangular prism according to the prior art.

The present invention will hereinafter be described in detail with respect to an embodiment thereof shown in the drawings.

Figure 3:
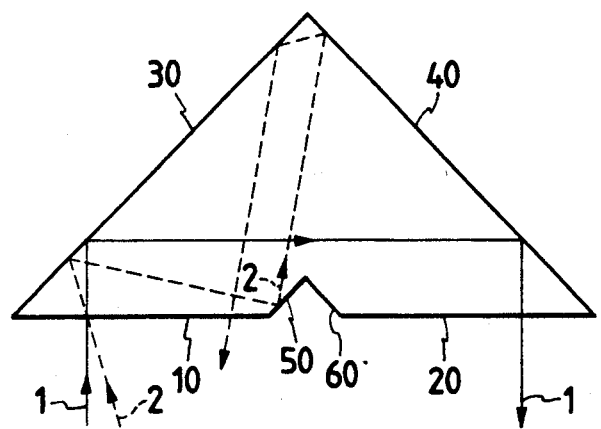
FIG. 3 is a cross-sectional view of the rectangular prism of the present invention.

FIG. 3 is a cross-sectional view showing the state of light rays in the rectangular prism of the present invention. In the construction shown, an entrance surface 10 and an exit surface 20 lie in the same plane and cooperate with reflecting surfaces 30 and 40 orthogonal to each other to form a substantially right-angled isosceles triangle. A light ray 2 incident from the entrance surface 10 and which and which is indicated by broken line is reflected by the first reflecting surface 30 and is totally reflected by the inclined surface 50 of a V-groove which is adjacent to the entrance surface 10. Therefore, the beam 2 does not emerge from the exit surface 20.

However, there is left the possibility of the totally reflected ghost light being repetitively reflected in the prism and emerging from the exit surface 20. So, in the present invention, in order to prevent this, the angle a of the inclined surface of the V-groove with respect to the entrance surface 10 is determined as per the following conditional expression:

$$35° < a < 45°  \quad (1)$$

and the direction of the ghost light is adjusted.

Figure 4:
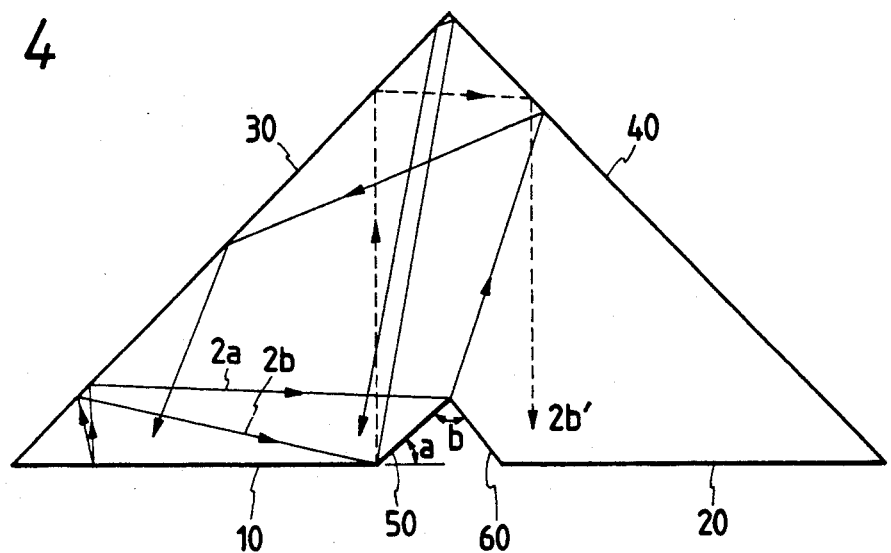
FIGS. 4 and 5 are cross-sectional views illustrating the optical path of a ghost light ray in the present invention.
Figure 5:
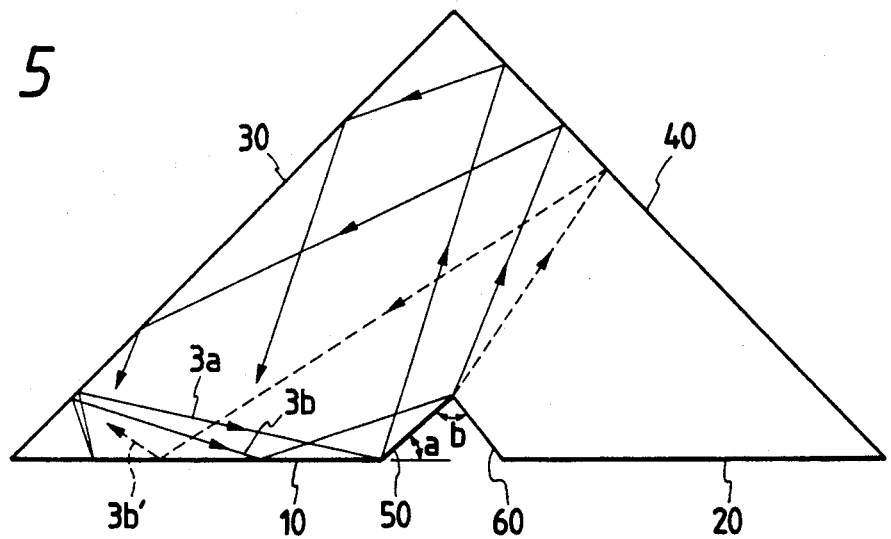

FIGS. 4 and 5 are optical path views showing the result obtained by analyzing the direction of the ghost light reflected by the inclined surface of the V-groove.

Solid lines 2a and 2b indicated in FIG. 4 represent light rays incident from the entrance surface 10 and directly arriving at the first reflecting surface. Solid lines 3a and 3b in FIG. 5 show light rays incident from the entrance surface 10 and reflected by the first reflecting surface 30, and again totally reflected by the entrance surface 10, and thereafter arriving at the inclined surface 50 of the V-groove which is adjacent to the entrance surface 10.

A case where the angle a formed by the inclined surface 50 of the V-groove with respect to the entrance surface 10 is greater than the upper limit of condition (1) will first be described with reference to FIG. 4. In this case, a light ray 2b indicated by solid line is reflected by the inclined surface 50 of the V-groove which is adjacent to the entrance surface 10, and is reflected by the first reflecting surface 30 as shown by a light ray 2b' indicated by broken line. The light ray which has travelled toward the second reflecting surface 40 is reflected by this reflecting surface 40 and finally emerges from the exit surface 20.

That is, the upper limit 45° of the angle a is determined as such an angle that there is not the possibility of the light ray totally reflected by the inclined surface 50 of the V-groove which is adjacent to the entrance surface 10 being first reflected by the first reflecting surface 30, then being reflected by the second reflecting surface and arriving at the exit surface.

Where conversely, the angle a is smaller than the lower limit of condition (1), the groove will become shallow and the effect of eliminating ghost light will decrease. This will now be described with reference to FIG. 5. The light ray incident from the entrance surface 10 is reflected by the first reflecting surface 30, is again totally reflected by the entrance surface 10 and arrives at the inclined surface 50 of the V-groove which is adjacent to the entrance surface 10. At this time, some of the light ray is reflected by the second reflecting surface 40 as indicated by broken line 3b', and travels toward the entrance surface 10 without being reflected by the first reflecting surface 30. Therefore, the light ray 3b' may be totally reflected by the entrance surface 10 and return to the exit surface 20.

That is, the lower limit 35° of the angle a is determined as such an angle that there is not the possibility of the light ray totally reflected by the inclined surface 50 of the V-groove which is adjacent to the entrance surface 10 being reflected by the second reflecting surface 40 and being again totally reflected by the entrance surface side.

The V-groove in the present embodiment is situated in the boundary between the entrance surface 10 and the exit surface 20, and more strictly, it is situated parallel to the ridgeline of the rectangular prism forming by the reflecting surfaces orthogonal to each other.

To plastic-mold the groove shape of the present invention accurately, it is also desirable that the vertex angle b of the V-groove be within the following range:

$$60° < b < 110°  \quad (2)$$

If the lower limit of this condition is exceeded, disturbance will be apt to occur in the entrance surface 10 or the exit surface 20, and if the upper limit of this condition is exceeded, the vertex angle will become too great and therefore, the sharp working of the V-groove will be difficult.

Figure 6:
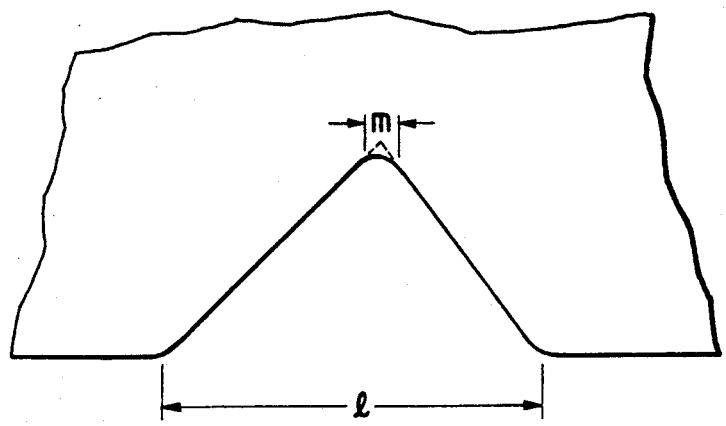
FIG. 6 is an enlarged view of a V-groove.

Although the vertex angle of the V-groove should desirably be as sharp as possible, what is actually molded is not so ideal, as shown in FIG. 6, due to particular constraints in manufacture.

However, it is desirable in molding that the width m of the base portion joining the inclined or side surfaces of the V-groove be 1/30 or less as compared with the width l of the groove in the entrance surface, in order that the irregular reflection on the edge end portion may be prevented.

The inclined surfaces of the V-groove, as shown in the above-described embodiment, are designed to totally reflect the light ray which will create ghost light, but it is not always necessary that the inclined surfaces be made into optically smooth surfaces equal to the entrance surface and the exit surface.

What is claimed is:

1. A rectangular prism including:
   an entrance surface for receiving light;
   an exit surface from which a principal portion of the light emerges;
   two reflecting surfaces orthogonal to each other for directing said principal portion of the light from said entrance surface to said exit surface; and
   a groove of V-shaped cross-section disposed at a boundary between said entrance surface and said exit surface, with a surface of said groove being inclined with respect to said entrance surface so as to totally reflect a portion of said light constituting ghost light and return the ghostly light to and back out through said entrance surface via said two reflecting surfaces; and
   wherein the following condition is satisfied:

$$35° < a < 45°,$$

where said inclined surface of said V-groove is adjacent to said entrance surface and "a" is the angle of said inclined surface with respect to said entrance surface.

2. A rectangular prism according to claim 1, wherein said V-groove is parallel to a ridgeline formed by said two reflecting surfaces.

3. A rectangular prism according to claim 1, wherein said entrance surface and said exit surface lie on the same plane.

4. A rectangular prism according to claim 1, which is formed of plastic and wherein the vertex angle b of said V-groove satisfies the following condition:

$$60° < b < 110°  \quad (2)$$

5. A rectangular prism according to claim 4, wherein the width m of a base portion joining the inclined surfaces of said V-groove is 1/30 or less as compared with the width l of said V-groove at said entrance surface.

6. A rectangular prism according to claim 1, wherein the inclined surfaces of said V-groove are non-painted optically smooth surfaces.

7. A rectangular prism according to claim 1, wherein the vertex of said V-groove is directed substantially toward a ridgeline formed by said two reflecting surfaces.

8. A rectangular prism including:

an entrance surface for receiving light;
an exit surface from which a principal portion of the light emerges;
two reflecting surfaces orthogonal to each other for directing said principal portion of the light from said entrance surface to said exit surface; and
a groove of V-shaped cross-section disposed at a boundary between said entrance surface and said exit surface, said V-groove having a surface which is inclined with respect to said entrance surface at an angle "a", where $35° < a < 45°$, and which totally reflects a portion of said light constituting ghost light such that the ghost light is returned to and back out through said entrance surface.

9. A rectangular prism according to claim 8, wherein said V-groove is parallel to a ridgeline formed by said two reflecting surfaces.

10. A rectangular prism according to claim 8, wherein said entrance surface and said exit surface lie on the same path.

11. A rectangular prism according to claim 8, which is formed of plastic and wherein the vertex angle b of said V-groove satisfies the following condition: $61° < b < 110°$.

12. A rectangular prism according to claim 11, wherein the width m of a base portion joining the inclined surfaces of said V-groove is 1/30 or less as compared with the width l of said V-groove at said entrance surface.

13. A rectangular prism according to claim 8, wherein the inclines surfaces of said V-groove are non-painted, optically smooth surfaces.

14. A rectangular prism according to claim 8, wherein the vertex of said V-groove is directed substantially toward a ridgeline formed by said two reflecting surfaces.

15. A rectangular prism including:
an entrance surface for receiving light;
an exit surface from which a principal portion of the light emerges;
two reflecting surfaces orthogonal to each other for directing said principal portion of the light form said entrance surface to said exit surface; and
a groove of V-shaped cross-section disposed at a boundary between said entrance surface and said exit surface, said V-groove having non-painted, optically smooth inclined surfaces, at least one of which totally reflects a portion of said light constituting ghost light such that the ghost light is returned to and back out through said entrance surface; and
wherein the following condition is satisfied:

$$35° < a < 45°$$

where "a" is an angle of said one inclined surface of said V-groove with respect to said entrance surface.

16. A rectangular prism according to claim 15, wherein said V-groove is parallel to a ridgeline formed by said two reflecting surfaces.

17. A rectangular prism according to claim 15, wherein said entrance surface and said exit surface lie on the same plane.

18. A rectangular prism according to claim 15, which is formed of plastic and wherein the vertex angle b of said V-groove satisfies the following condition: $60° < b < 110°$.

19. A rectangular prism according to claim 18, wherein the width m of a base portion joining the inclined surfaces of said V-groove is 1/30 or less as compared with the width l of said V-groove at said entrance surface.

20. A rectangular prism according to claim 15, wherein the vertex of said V-groove is directed substantially toward a ridgeline formed by said two reflecting surfaces.

* * * * *